United States Patent [19]

Yanagawa et al.

[11] 4,045,094
[45] Aug. 30, 1977

[54] RELAY VALVE COMBINED WITH A LOAD-SENSING PROPORTION VALVE

[75] Inventors: Itiro Yanagawa; Isao Suzuki, both of Higashimatsuyama, Japan

[73] Assignee: Jidosha Kiki Co., Ltd., Tokyo, Japan

[21] Appl. No.: 621,594

[22] Filed: Oct. 10, 1975

Related U.S. Application Data

[62] Division of Ser. No. 469,008, May 10, 1974, Pat. No. 3,936,097.

[30] Foreign Application Priority Data

May 30, 1973  Japan ............................. 48-60555
May 30, 1973  Japan ............................. 48-60556

[51] Int. Cl.$^2$ .......................................... B60T 8/22
[52] U.S. Cl. ................................. 303/22 R; 303/40
[58] Field of Search ........... 188/195; 303/22 R, 22 A, 303/6 A, 40

[56] References Cited

U.S. PATENT DOCUMENTS

| | | | |
|---|---|---|---|
| 1,156,952 | 10/1915 | Ward | 188/195 |
| 2,553,805 | 5/1951 | Bent | 188/195 |
| 3,188,149 | 6/1965 | Pekrul | 303/22 R |
| 3,302,982 | 2/1967 | Pekrul | 303/22 R |
| 3,484,138 | 12/1969 | Cumming | 303/22 R |
| 3,512,845 | 5/1970 | Farmery et al. | 188/195 |
| 3,586,389 | 6/1971 | Page et al. | 303/22 R |
| 3,612,621 | 10/1971 | Scott | 303/22 R |

FOREIGN PATENT DOCUMENTS 555,417  8/1943  United Kingdom ............. 303/22 R

Primary Examiner—Trygve M. Blix
Assistant Examiner—Edward R. Kazenske
Attorney, Agent, or Firm—Toren, McGeady and Stanger

[57] ABSTRACT

A combined load-sensing proportion and relay valve for an air brake system including a valve disk which has an exhaust passage in its axial center and is adapted to hold the valve in normally closed position, and a control piston unit which is actuated by an indicated pressure from a brake valve to move the valve disk and open the valve. The control piston unit includes a first pressure-sensing piston for controlling the valve-opening action of the valve disk and a second pressure-sensing piston coaxially connected to the first piston via a spring therebetween. A stroke adjusting device is provided to control the axial movement of the second piston correspondingly to the payload of the vehicle.

8 Claims, 17 Drawing Figures

FIG. 1 (II)

RELAY VALVE COMBINED WITH A LOAD-SENSING PROPORTION VALVE

This is a division of application Ser. No. 469,008 filed on May 10, 1974, now U.S. Pat. No. 3,936,097.

BACKGROUND OF THE INVENTION

This invention relates to a novel relay valve combined with a load-sensing proportion valve, and more specifically to a combined load-sensing proportion and relay valve capable of automatically adjusting the pressure applicable to the power chambers of brake actuators.

Rapid development of commercial transport by such large motor vehicles as trailer-trucks in recent years has been coupled with the introduction of faster cars to cause more and more serious traffic jams on roads. In view of this, greater safety of the vehicles, that is, a braking system more reliable in action and more stable in performance than ever, is being called for.

With these heavy-duty vehicles, service brakes of the pneumatic type prevail in which indicated braking pressure from the brake valve is conducted to the relay valve so that compressed air corresponding to the indicated pressure is supplied to the brake actuators via the relay valve. Since the axle-to-axle load ratio can vary largely, according to whether the vehicle is empty or loaded, the air brake system is designed to control the indicated pressure according to the movable load the vehicle carries, or the distance between the upper portion and lower portion of the spring of the suspension and thereby adequately proportion the braking forces applicable to the individual axles, avoiding any unbalanced braking action, such as partial locking of any axle alone. In order to obtain the indicated pressure corresponding to the payload as described above, a conventional brake circuit as schematically shown in FIG. 1 (I) has, between the brake valve $a'$ and the relay valve $b'$, a load-sensing proportion valve $c'$ which regulates the indicated pressure from the brake valve before the pressure is delivered to the relay valve. Also included in the circuit is a reservoir $d$, a power chamber $e$, and a slack adjuster $f$. However, installing the load-sensing proportion valve in the line accordingly increases the amount of air retained in the line and, inasmuch as air is a compressible medium itself, the increased air volume in the line inevitably causes a lag in response of the brake actuators to the instruction from the brake valve.

SUMMARY OF THE INVENTION

It is a principal object of the present invention to provide a novel relay valve that combines the features and functions of both a load-sensing proportion valve and a relay valve, so that the transmission velocity of indicated pressure is increased and quick brake response is ensured.

The relay valve according to the invention, as schematically shown in FIG. 1 (II), combines the load-sensing proportion valve $c'$ and the relay valve $b'$ of FIG. 1 (I) in an integral unit.

In an ordinary air brake circuit, the load-sensing proportion valve $c'$ and the relay valve $b'$ are arranged in series, and two hystereses of output pressures of said two valves corresponding to the indicated pressure are added to each other. Consequently, the output pressure the power chamber $e$ eventually receives deviates to a considerable degree from the value indicated by the brake valve $a'$. The valve according to the invention, which combines the two existing valves in a unitary structure, exhibits a hysteresis substantially equal to that of a conventional relay valve.

It is therefore another object of the invention to provide a relay valve with minimized hysteresis for positive braking action without any time lag in response to the indicated braking pressure.

The relay valve according to this invention, which replaces both the load-sensing proportion valve and the relay valve in an ordinary braking circuit, simplifies the air brake system and reduces the assembling cost of the system. Still another object of the invention, therefore, is to provide an air brake circuit which is made more reliable and less costly than existing ones by the use of the relay valve according to this invention.

In order to realize the foregoing objects, the relay valve according to the invention has the following construction. Like its counterpart in the conventional relay valves, the valve disk of the valve for opening and closing the brake circuit has an axial center hole as an exhaust passage and is spring-biased to a normally closed position; it is opened when pressed down against the spring. Coaxially with the valve disk, there is installed a control piston unit for opening the valve by actuating the valve disk with the indicated pressure from the brake valve. The control piston unit comprises a first pressure-sensing piston for directing moving the valve disk to open the valve, and a second pressure-sensing piston engaged with the first piston via a spring, and is equipped with adjusting means for adjusting the position and limiting the stroke of the second piston depending upon the movable load the vehicle carries.

It is often the case with such large motor vehicles as trucks, buses, and trailer-vehicle which have special body construction that, for some reason or other, their suspension springs are compressed more than the amount of compression they are normally subjected to when the vehicle carries a movable load, or are elongated more than when the vehicle is empty. The compression or elongation may be quite outside the normal deflection range of the suspension springs under no-load and loaded conditions. It is objectionable that such excessive or insufficient displacement of the suspension acts on the relay valve.

A further object of the invention is, therefore, to provide a combined load-sensing proportion and relay valve wherein any excessive or insufficient deflection of the suspension outside the range corresponding to the usual load condition is absorbed by control cam means associated with linkage so that the service brake pressure is always adequately controlled correspondingly to the movable load of the vehicle.

The above object is realized by a combined load-sensing proportion and relay valve of the following construction. In the relay valve of the character described, there is provided a control cam integral with a lever which is turnable about a pivot pin, and the cam face consists of an actuating cam face section for imparting a sliding motion to stroke adjusting means, such as a tappet or thrust rod, in engagement with the cam face to cover the usual deflection range of the suspension springs, and an idle cam face section for imparting no sliding motion to the tappet or thrust rod in the case of any excessive or too small deflection. In this way any deflection of the suspension which is too large or too small is absorbed and not transmitted to the relay valve body.

Other objects and advantages of the invention will become apparent from the following description of embodiments with reference to the accompanying drawings, wherein:

BRIEF DESCRIPTION OF THE DRAWINGS

FIG. 1 (II) is a schematic diagram of an air brake system using a combined load-sensing proportion and relay valve of the invention;

DESCRIPTION OF THE INVENTION

Figure 2:
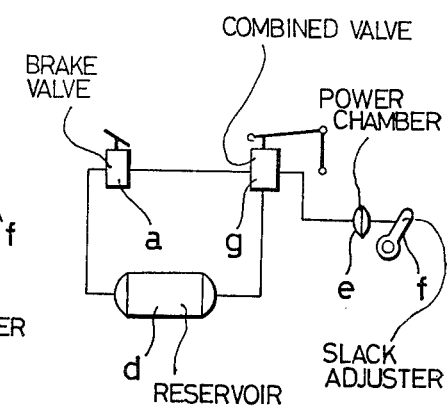
FIG. 2 is a vertical sectional view of a combined valve embodying the invention.
Figure 2:
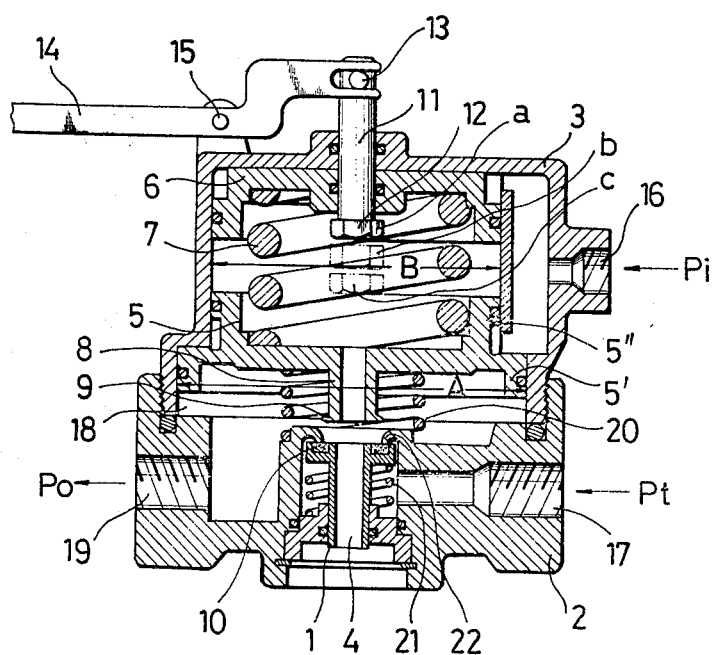

FIG. 2 schematically shows the construction of a typical relay valve according to this invention, as comprising a valve disk 1, a valve body 2 accommodating the disk, and a valve bonnet 3 enclosing a control piston unit located coaxially with the valve disk 1. The disk has an axial center hole as an exhaust passage 4. The control piston unit consists of a first pressure-sensing piston 5, a second pressure-sensing piston 6, and a spring 7 extended between the two pistons. The first pressure-sensing piston 5 takes the form of a stepped double piston consisting of a large piston part 5' with a diameter A and a small piston part 5" with a diameter B. Its pressure-receiving area is, therefore, the annular zone defined between the two diameters A and B. The first piston 5 has on its underside a downward extension 8, which in turn is formed with a valve seat 9 at its lower end adapted to contact a valve seat 10 attached to the upper surface of the valve disk 1. This arrangement permits the downward motion of the first piston 5 to be transmitted to the valve disk 1 via the extension 8 and the valve seats 9, 10, so as to depress the valve disk 1 and open the valve. On the other hand, the second pressure-sensing piston 6 has the same diameter B as the small piston part 5", with an indicated pressure applicable on the entire area having the diameter B, and its downward motion is transmitted to the first piston through the spring 7, until it reaches a limit set by a stroke adjuster consisting of a vertically set rod 11 extended slidably through the second piston and a stopper 12 formed at the lower end of the rod. The rod 11 has at its upper end a horizontally protruding pin 13 through which to engage a lever 14, and is moved, together with the stopper 12, upward and downward by the lever. For example, if the lever 14 in the position shown is turned clockwise about a pivot 15, the stopper 12 will be moved from the position a to b and thence to c. The left end of the lever 14 is engaged, for example, with the underside of a suspension spring (not shown), in such a way that the lever senses a change in the height of the vehicle with the load it carries and transmits the signal to the stroke adjuster.

With the construction so far described, the combined load-sensing proportion and relay valve according to the invention operates in the following manner.

Figure 3:
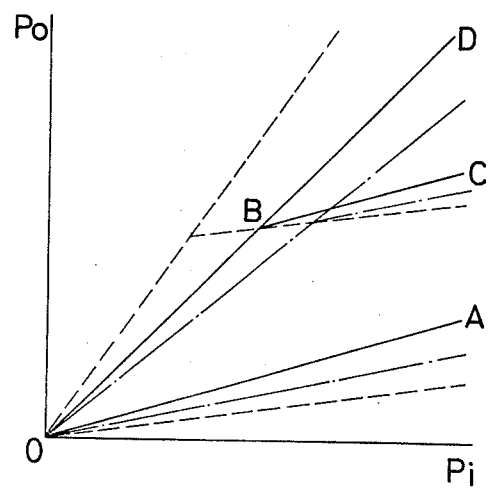
FIG. 3 is a graph representing the characteristics of the valve shown in FIG. 2.

If it is assumed that the stopper 12 is in the position a as shown in FIG. 2, an indicated pressure Pi from a brake valve (not shown) is led into the valve through a port 16 and exerted on the annular pressure-receiving surface of the first pressure-sensing piston 5 and the pressure-receiving surface of the second pressure-sensing piston 6. The second piston 6 is kept from moving downward by the stopper 12, whereas the first piston 5 is forced downward by the indicated pressure Pi applied on its annular pressure-receiving surface. This causes the extension 8 of the first piston to contact and depress the valve seat 10, with the result that the valve disk 1 is forced down to open the valve and admit compressed air supply pressure Pt from an inlet port 17 to a chamber 18. While the indicated pressure Pi is exerted on the annular surface of the first piston 5, an output pressure Po acts on the other side of the piston facing the chamber 18. The relation between the indicated pressure Pi and the output pressure Po based on the difference between the pressure-receiving areas on the both sides of the first piston is represented by a full line O-A in the graph of FIG. 3 which gives typical characteristic curves of the relay valve according to the present invention.

When the stopper 12 of the stroke adjuster has assumed the position b in FIG. 2, the indicated pressure Pi is again exerted on the annular pressure-receiving surface of the first pressure-sensing piston 5 and on the second pressure-sensing piston 6. In this case the second piston 6 transmits the pressure it receives to the first piston 5 via the spring 7, until its further downward motion is prevented by the stopper 12. This means that the first piston 5 is subjected not only to the indicated pressure Pi on its annular surface but also to the pressure that the second piston 6 receives and transmits to the first piston via the spring 7. Meanwhile, the output pressure Po acts on the other side of the first piston 5. Thus, the balance between the forces exerted on the both sides of first pressure-receiving piston is plotted in FIG. 3, wherein the relationship between the indicated pressure Pi and the output pressure Po is represented by a full line O-B. The point where the second piston is stopped by the stopper 12 is indicated at B in FIG. 3.

With a further rise of the indicated pressure Pi, the pressure increment acts only upon the annular pressure-receiving surface of the first pressure-sensing piston 5. The increment of the pressure against the second pressure-sensing piston 6 is borne by the stopper 12 and does not contribute to an increase in the downward force of the first piston 5. The characteristic is represented by the full line B-C in FIG. 3. Thus, the valve disk 1 is pressed down, opening the valve, and compressed air supplied at the pressure Pt through the inlet opening port 17 passes through the spaced formed above the valve disk 1 and goes to the power chamber of a brake actuator (not shown) at the output pressure Po via the outlet port 19.

The shifting point B can be changed as desired by the positional adjustment of the stroke adjuster. Further, the ratio of the indicated pressure Pi to the output pressure Po can also be changed, as indicated by broken lines and alternate long and short dashes lines in FIG. 3, by varying the area ratio of the annular pressure-receiving surface of the first pressure-receiving piston to the surface of the same piston that receives the output pressure, or the area ratio of the sum of the surfaces of the first and second pistons that are subjected to the indicated pressure Pi to the surface of the first piston that receives the output pressure Po.

Should the function of the stroke adjuster to hold the second pressure-sensing piston 6 be lost on account of a break of the pin 13, lever 14, or pivot 15, the indicated pressure for the second piston 6 will be directly transmitted to the first pressure-sensing piston 5 through the spring 7. Here the relationship between the indicated pressure Pi and the output pressure Po will be as indicated by the line O-B-D in FIG. 3. The valve operation in this case is similar to that of a conventional relay valve. Thus, despite a failure of the stroke adjuster, the valve according to the invention will effect the necessary braking action with no danger of insufficient braking force.

When the brake valve has closed and the indicated pressure released, the control piston unit comprising the first and second pressure-sensing pistons is forced upward by a spring 20, with the extension 8 away from the valve seat 10. At the same time, the valve disk 1 is lifted, too, by a spring 21 until the valve seat 10 comes into contact with a valve seat 22 formed on the valve body to cut off the flow of the supply pressure. The compressed air in the line leading from the outlet port 19 to the brake actuator is discharged by way of the exhaust passage 4. In this way the valve action for controlling the actuator for service brake is released.

Figure 1:
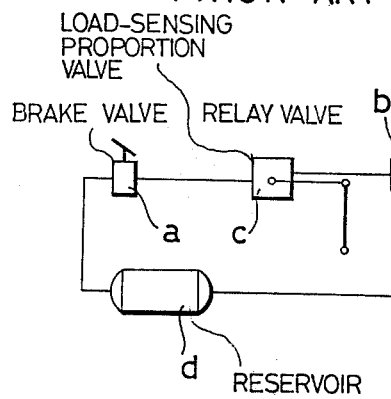
FIG. 1 (I) is a schematic diagram of an air brake system equipped with a conventional load-sensing proportion valve.
Figure 4:
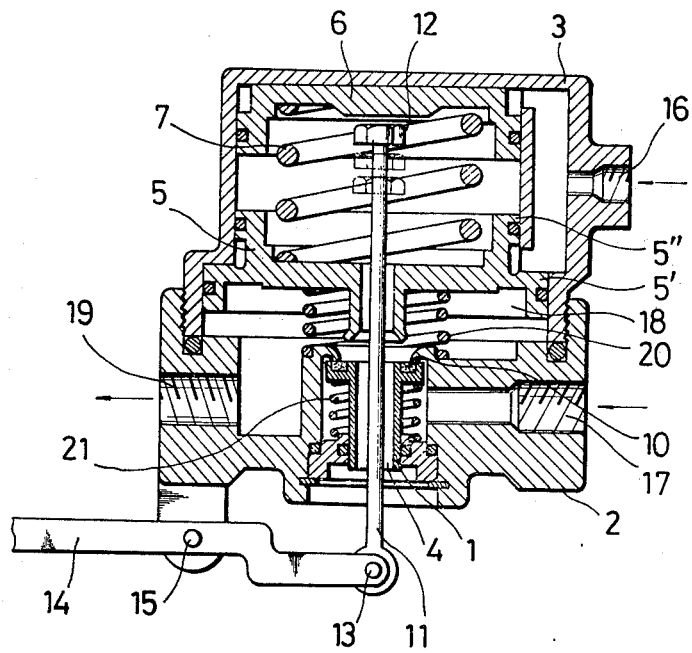
FIG. 4 is a vertical sectional view of another embodiment of the invention.

FIG. 4 illustrates another embodiment of the invention, in which the parts like those in the embodiment of FIG. 2 are designated by like reference numerals. In this embodiment, the storke adjuster consists of a rod 11 held upright by suitable guide means (not shown) from the lower end of the valve body 2 and through the valve disk 1 and the first pressure-sensing piston 5, and a stopper 12 attached to the upper end of the rod 11. The stroke adjuster is moved upward and downward (to one of the positions a, b, and c) by a lever 14 supported at a pivoted pin 15. In the same manner as in the embodiment of FIG. 1, the lever 14 is connected to a suitable point of a car body component, such as a suspension spring, the level of which changes with the payload of the vehicle. It will be readily appreciated upon comparison of FIGS. 2 and 4 that this embodiment of relay valve is exactly same in construction and operation as the preceding embodiment except that the rod 11 for moving the stopper is inserted into the valve body 2 from its lower end instead of from the upper end.

Figure 5:
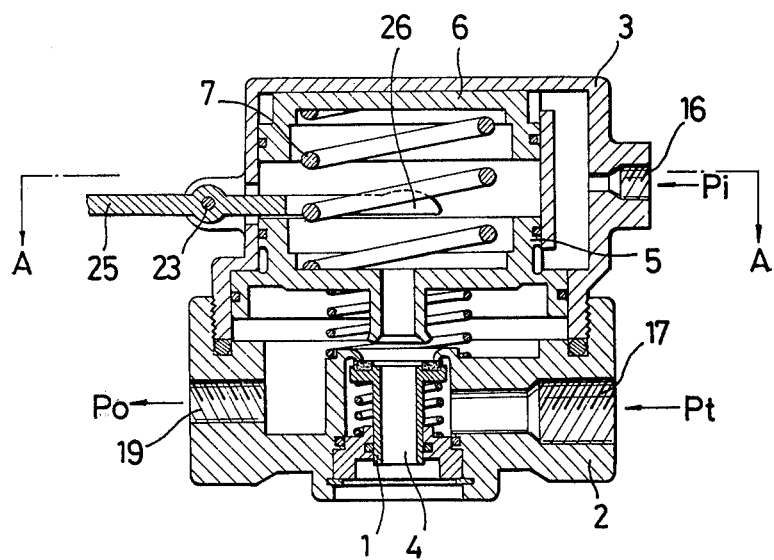
FIG. 5 is a vertical sectional view of still another embodiment of the invention.
Figure 6:
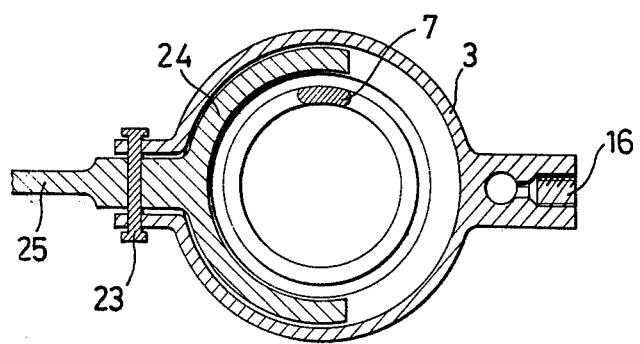
FIG. 6 is a transverse or radial sectional view taken along line A—A of FIG. 5.

In FIGS. 5 and 6 is shown another embodiment of the invention. The movement of the second pressure-sensing piston 6 in this embodiment is restricted by a lever 25, which is inserted into the valve through the bonnet wall to swing up and down about a pivot 23 secured to an intermediate height of the side wall of the bonnet 3, with the right portion of the lever 25 as viewed in the figures having a semicircular bifurcation 24. The left end of the lever 25 is usually connected to a suitable point of the lower part of a suspension spring, in such manner that a change in the level of the vehicle body is diminished by the leverage and converted to the up-down movement of a pad 26 at the front of the bifurcation 24, whereby the second pressure-sensing piston 6 is controlled according to the height or payload of the vehicle. The functions of other components and the operation of the assembly as a relay valve are the same as those of two preceding embodiments.

Figure 7:
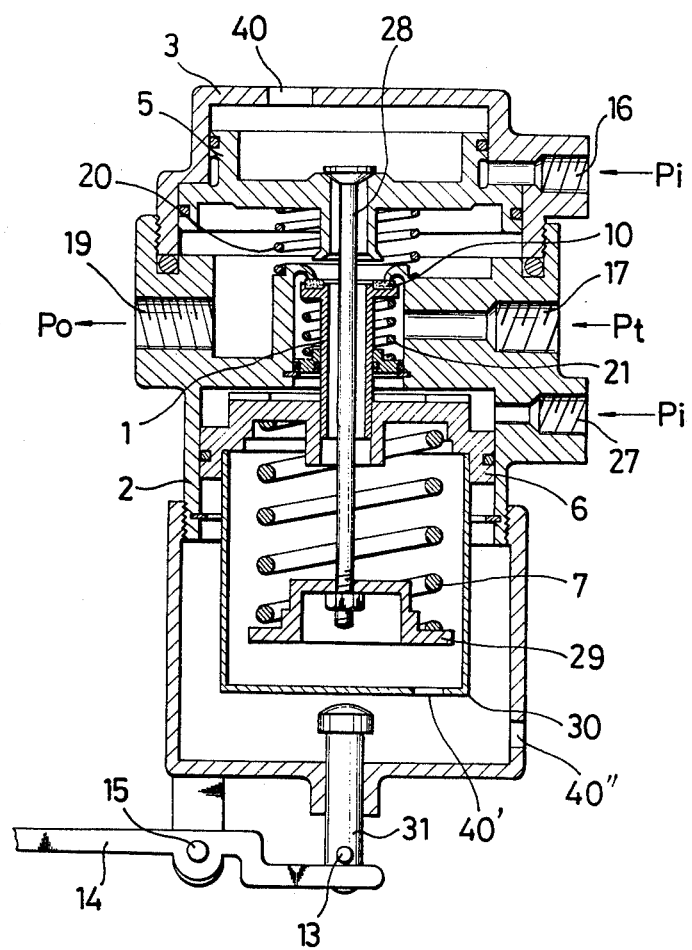
FIG. 7 is a vertical sectional view of a further embodiment of the invention.

FIG. 7 represents still another embodiment of the invention, in which the second pressure-sensing piston 6 is located under the valve disk 1, and the indicated pressure Pi from the brake valve is led via a port 16 to the pressure-receiving surface of the first piston 5 and also lead via another port 27 to the pressure-receiving surface of the second piston 6.

The first pressure sensing piston 5 is connected to the second piston 6 via a rod 28, a retainer 29, and spring 7, and the motion of the second piston is controlled by a tappet 31 that is actuated by a lever 14, through a cover 30 that encloses the spring 7 and a retainer 29. Vent holes 40, 40',40'' are formed in the bonnet and the cover, the body respectively.

Figure 8:
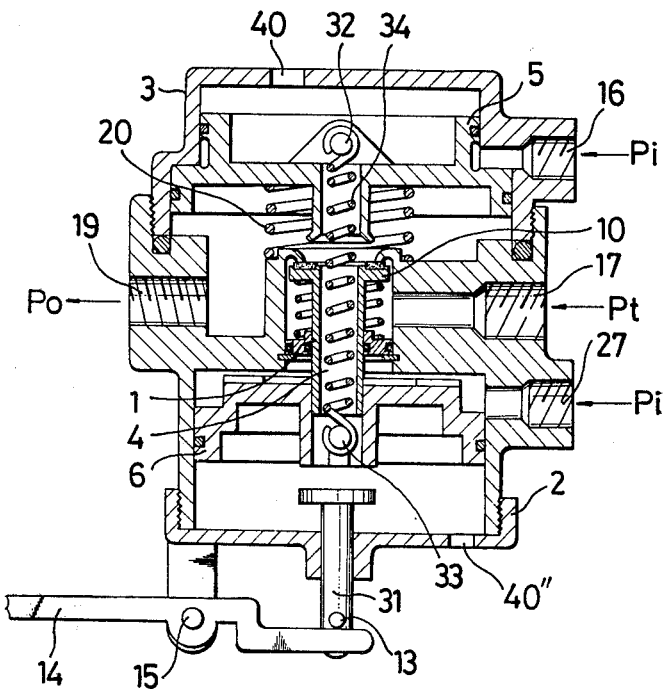
FIG. 8 is a vertical sectional view of a modification of the embodiment shown in FIG. 7.

FIG. 8 shows a modification of the embodiment given in FIG. 7. The rod 28, retainer 29, and spring 7 used in connecting the both pressure-sensing pistons in FIG. 7 are replaced by a single spring 34 stretched between pins 32, 33 on the inner walls of the both pistons. Thus the modification is featured by a smaller number of components required.

Figure 9:
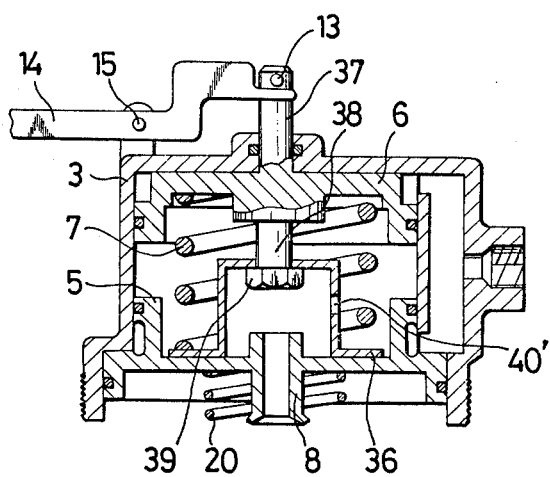
FIG. 9 is a fragmentary sectional view showing a modified form of connection between first and second pressure-sensing pistons.

FIG. 9 shows another modification of the mechanism for connecting the two pressure-sensing pistons. A spring 7 is held between the second pressure-sensing piston 6 and a retainer 36, and a rodlike upward extension 37 of the second piston is engaged with a lever 14 by a pin 13. In addition, the second piston has a rodlike downward extension 38 which is slidably inserted into a retainer 36 and is fastened at its threaded lower end with a nut 39 to keep the retainer 36 from dropping off from the downward extension 38.

Figure 10:
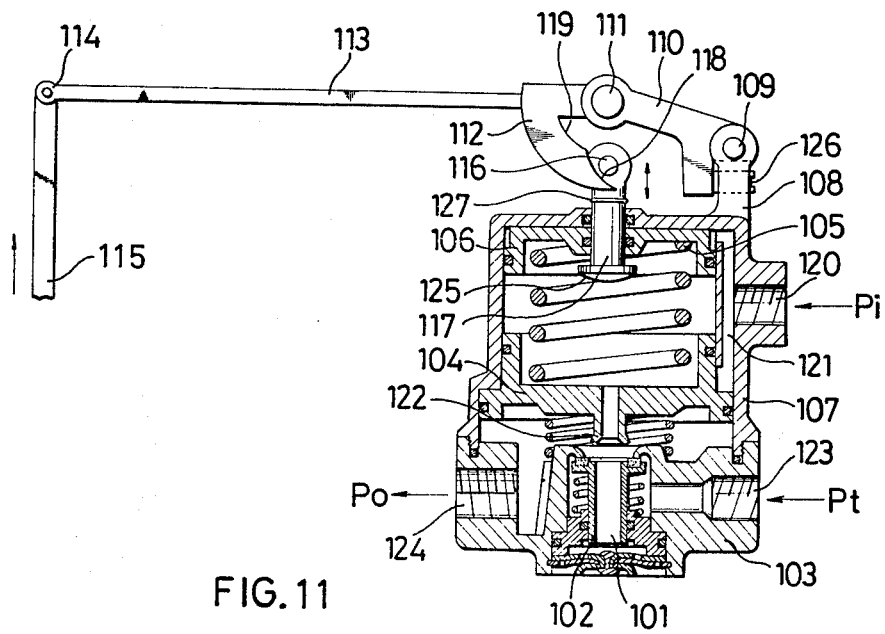
FIG. 10 is a vertical sectional view of a combined load-sensing proportion and relay valve equipped with control cam means.

Shown in FIG. 10 is a combined load-sensing proportion and relay valve equipped with control cam means according to this invention. Generally the embodiment comprises a valve body 103 accommodating a valve disk 102 formed with an axial center hole as exhaust passage 101, and a valve bonnet 107 enclosing a control piston unit which consists of a first pressure-sensing piston 104, a spring 105, and a second pressure-sensing piston 106. A bracket 108 is formed on an upper portion of the bonnet 107, and a connector 110 pivotally supported at one end by a pin 109 on the bracket. The other end of the connector 110 is connected by a pin 111 to a link 113 formed integrally with a cam 112. The link 113 is pivotally connected by a pin 114 at its left end with a tension rod 115, which in turn is engaged at its lower end (not shown) with a suitable point of the lower portion of each suspension spring.

The control cam 112 has an actuating cam face 118 for moving the rod 117 upward and downward via a pin 116, and an idle cam face 119 forming an arc with a radius R centered in the pin 111 and contiguous to the actuating cam face 118. The deflection of the suspension spring within the usual range under empty and loaded vehicle conditions is covered by the actuating cam face 118, and the region of excess deflection is covered by the idle cam face 119.

As indicated braking pressure Pi from the brake vavlve opened by the foot-pedal operation enters the pressure chamber 121 of the control piston unit through a port 120, and acts on both the first pressure-sensing piston 104 and the second pressure-sensing piston 106 connected to the first piston by the spring 105. The first piston 104 is formed down by the indicated pressure to open the valve disk 102 by means of its downward extension 122. Consequently a supply pressure Pt is admitted from an inlet port 123 to the space formed along the valve disk 102, and leaves an output port 124 as the service braking pressure. The output pressure Po is then supplied to the pressure chamber of the brake actuator not shown. The second piston 106 too is brought down by the indicated pressure to depress the first piston 104 via the spring 105 but, beyond a certain indicated pressure, its downward movement is restricted by a stopper 125 attached to the lower end of the rod 117. From then on the first piston 104 takes over the control of the valve disk 102 to open the valve. With this embodiment, a deflection of each suspension spring is transmitted with a reduction in degree via the rod 115, link 113, and cam 112, the position of the rod 117 is set by the cam 112, and the valve disk 102 is actuated to open the valve according to the payload of the vehicle. In the manner described the service brake pressure is controlled depending upon the movable load.

In the embodiment being described, the lower end of the actuating cam face 118 of the cam 112 corresponds to the loaded condition, and the other end of the fact that adjoins the idle cam face 119 corresponds to the empty condition. The actuating cam face 118 is shaped to a suitable curvature to attain desired characteristics in relation to the indicated pressure and braking output pressure involved. The idle cam face 119 that has the radius R effects no displacement as long as the pin 116 on the rod 117 remains in contact with the idle cam face 119. The arcuate length of the idle cam face 119 is so chosen as to correspond to the maximum deflection minus the deflection in the loaded condition of the assoociated suspension spring.

As stated, the tip of the actuating cam 118 corresponding to the deflected position of the associated suspension spring of the vehicle in the loaded condition, must be positioned to engage the pin 116 when the rod 117 is in its lowermost position. In the initial position setting, the inclination of the connector 110 is suitably adjusted by turning a screw 126 and thereby adjusting the position of the pin 111.

Figure 11:
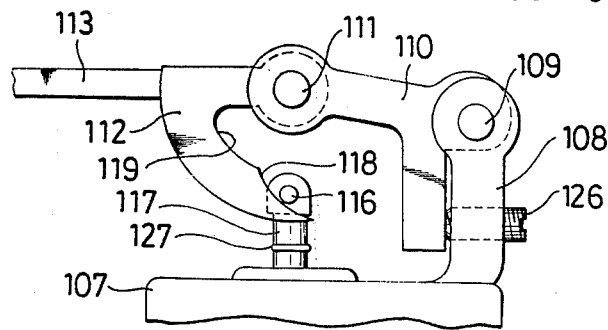
FIG. 11 is an enlarged view of a control cam assembly, showing the positional relations among its component parts when the associated suspension spring is within a normal range of deflection.
Figure 12:
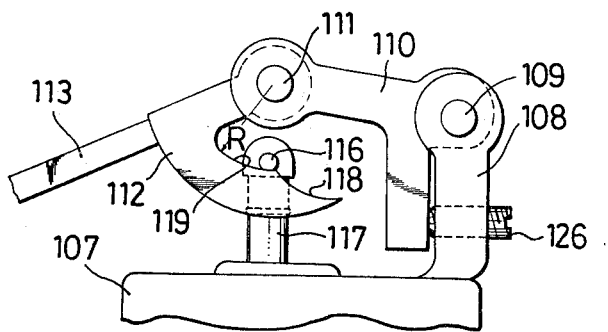
FIG. 12 is a view similar to FIG. 11 but when the deflection of the suspension spring is far less than the normal range.
Figure 13:
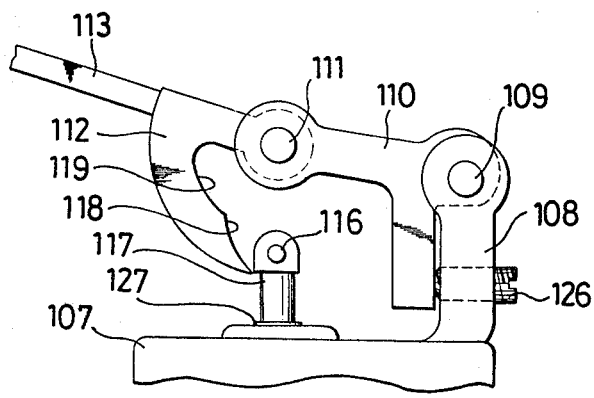
FIG. 13 is a view similar to FIG. 11 but when the suspending spring has been subjected to an unusual compressive deflection.

FIGS. 11, 12 and 13 are details illustrating the positional relationship of the control cam 112 and related components in respect of the connection suspension spring deflected within the normal range, and deflected excessively and insufficiently, respectively. FIG. 11 shows the working position the control cam assumes when the vehicle carries a moderate load. The cam-follower pin 116 is in contact with an intermediate point of the actuating cam face 118, and the rod 117 is in a slightly lifted position.

Now if the particular wheel drops in a depression of a road, the suspension spring will be momentarily relieved of the weight of the vehicle and set free from the compression under load. The spring deflection will be far less than the normal range. As a result, the tension rod 115 is sharply pulled downward, turning the lever 113 and control cam 112 counter-clockwise. This enables the pin 116 to move past the actuating cam face 118 onto the idle cam face 119. FIG. 12 shows the relationship of the control cam and the associated parts when the deflection of the suspension spring is unusually small. Since the idle cam face 119 is arcuately with the radius R, the rod 117 remains lifted in the uppermost position as long as the pin 116 is in contact with the cam face 119.

Next, it is assumed that the same wheel of the vehicle has rolled over a bump on a road. The suspension spring is unusually compressed to absorb the inertial energy of the body, and the compressive deflection of the spring far exceeds the normal deflection range. Contrary to the case above described, the tension rod 115 is sharply pulled up, and the lever 113 and control cam 112 turn together clockwise, moving the tip of the control cam away from the pin 116 as shown in FIG. 13. However, because the stroke of the rod 117 is limited by the upper stopper 127 that is seated on the upper surface of the bonnet 107, the rod 117 can maintain its lowermost position under normally loaded condition despite the unusual deflection of the suspension spring.

In the embodiment shown in FIGS. 10 through 13, the rod 117 is kept depressed and there is no possibility of the pin 116 being disengaged from the control cam 112. However, in the case where the rod is not always forced downward, it is impossible to have the pin engaged always on its underside with the cam.

Figure 14:
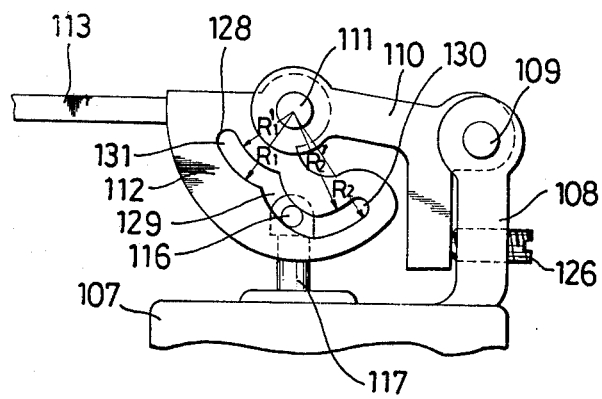
FIG. 14 is an enlarged view of a mechanism using a control cam of the type having a cam slot in which an engaging pin on a rod as the stroke-adjusting means for the second pressure-sensing piston is fitted to actuate the cam.

FIG. 14 shows the pin 116 engaged with the control cam 112 through a slot 128 formed in the cam plate. The cam slot 128 consists of an actuating cam slot portion 129 and idle cam slot portions 130, 131 formed in the front and rear of the actuating slot portion in continuation thereof. The idle cam slot portion 130 corresponds to the excessive deflection range of the suspension spring, and the other idle slot portion 131 to the range of insufficient deflection. The former is arcuately shaped with radii $R_2$ and $R'_2$, and the latter with raddi $R_1$ and $R'_1$. Thus, while the cam-follower pin 116 slides within either idle slot portion, the rod 117 will maintain its uppermost or lowermost position, as the case may be, in the same manner as in the immediately preceding embodiment.

Figure 15:
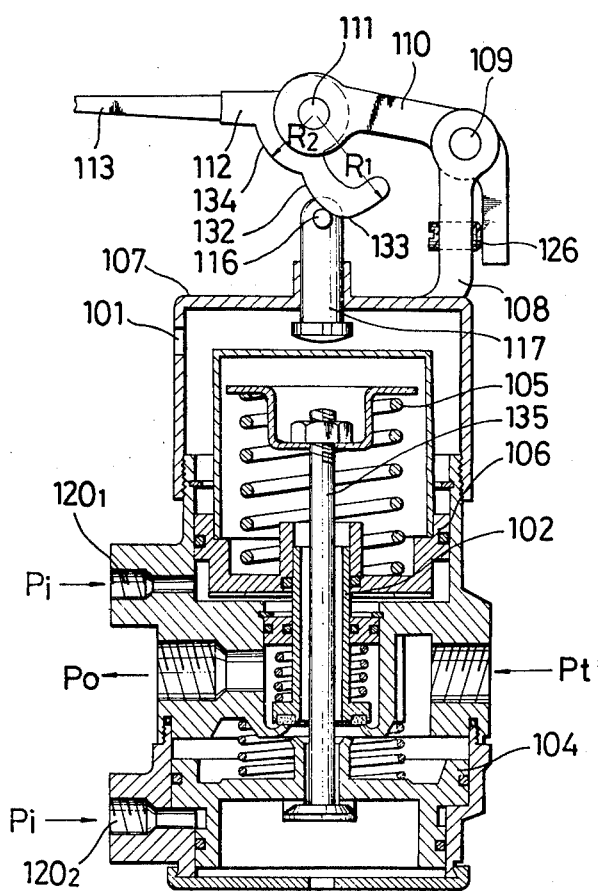
FIG. 15 is an enlarged sectional view of a mechanism incorporating another form of control cam.

FIG. 15 shows the control cam 112 and the related components with a rod 117 constantly urged upward, contrary to the arrangement in the embodiment of FIGS. 10 to 13. The tappet 117 is in contact at the upper end of its pin 116 with the control cam 112, and the position of the rod 117 is set depending on the position where the control cam 112 turns, or according to the deflection of the suspension spring. The control cam consists of the combination of an actuating cam face 132, an idle cam face 133 having a radius $R_1$, and another idle cam face 134 having a radius $R_2$, said idle cam faces adjoining to the front and rear ends, respectively, of the actuating cam face in the center. The idle cam face 133 corresponds to the range of excessive deflection of the suspension spring, and the other cam face 134 corresponds to the range of insufficient deflection.

In the valve of the invention as embodied here, the first and second pressure-sensing pistons 104, 106 are separated by the valve disk 102 located therebetween in a vertical arrangement. The two pistons are connected together by a rod 135 set upright through the valve disk 102. The indicated pressure is then admitted from upper and lower ports $120_1$, $120_2$ into the respective pressure chambers. The mechanical function of the valve disk 102 to open the valve according to the loaded condition of the vehicle is the same as that which has been described in connection with FIG. 10, and therefore the explanation is omitted.

Figure 16:
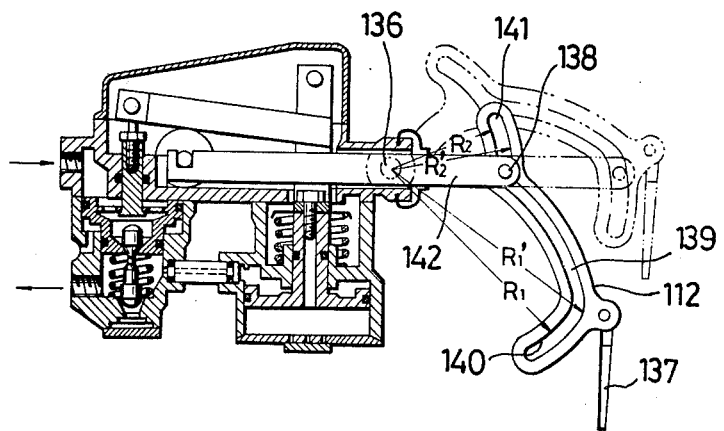
FIG. 16 is a vertical sectional view showing the construction of a load-sensing proportion valve according to the invention.

FIG. 16 shows an ordinary load-sensing proportion valve incorporating the present invention. As shown a control cam 112 is mounted swingably about a pin 136 provided on a boss on the right side wall of the valve body, and a rod 137 is connected to a lug extending from the lower right part of the cam. A cam-follower pin 138 fitted in the cam slot enables a control rod 142 to slide horizontally. The control cam 112 is formed of an actuating cam slot portion 139 corresponding to the normal deflection range of the suspension spring, and idle cam slot portions 140, 141 adjoined to the front and rear ends, respectively, of the actuating cam slot portion. The cam slot portion 140, which consists of an arc having radii $R_1$ and $R'_1$, covers the excessive deflection range of the suspension spring, and the cam slot portion 141, which consists of an arc having radii $R_2$ and $R'_2$, covers the range of insufficient deflection. As long as the pin 138 remains within the cam range of either cam slot portion 140 or 141 upon the vertical movement of the rod 137, no thrust is given to the control rod 142. Only when the pin 138 resides in the actuating cam slot portion 139, or while the suspension spring is within the normal deflection range, the control rod 142 slides to adjust the indicated pressure according to the payload that is being transmitted to the relay valve connected by piping in series to the load-sensing proportion valve.

As has been described above in the form of preferred embodiments thereof, the combined load-sensing proportion and relay valve in conformity with the present invention permits braking operation best suited to the axle static and dynamic loads of the vehicle regardless of the road or driving condition. The invention therefore greatly contributes to the safe operation of large over-the-road vehicles, such as trucks, buses, and tractor-trailer systems.

While the invention has been described in its preferred embodiments, it is to be understood that the invention is not limited thereto but numerous changes and variations may be made without departing from the spirit and scope of the following claims.

What is claimed is:

1. A combined load-sensing proportion and relay valve for an air brake system in a vehicle comprising:
   a valve body having an inlet port connected to an air source and an outlet port connected to a brake actuator and an internal chamber, said body including a passageway extending from said inlet port and through said chamber to said outlet port;
   said valve body having an axial center hole as exhaust passage;
   a valve disk mounted within part of said exhaust passage and being interposed in said passageway and cooperating with a valve seat formed on said body for opening said passageway to provide communication between said inlet and outlet port, and closing said passageway to provide communication between said outlet port and said exhaust passage;
   a control inlet port for supplying a control pressure from a brake valve to said valve body;
   a control piston unit mounted coaxially with said valve disk within said valve body, said unit being responsive to said control pressure applied through said control unit port, said control piston unit including a first pressure sensing piston for directly governing the opening and closing of said valve disk, a second pressure sensing piston coaxially connected and resiliently coupled by a spring with said first pressure sensing piston;
   a rod mounted for axial movement disposed in an upper portion of said valve body, said rod having a stopper element at one end for limiting axial movement of the second control piston;
   a bracket being disposed on said upper portion of said valve body;
   a linkage mounted for movement with respect to said bracket, said linkage being movable responsive to a payload of the vehicle in an axial valve direction; and
   a control cam forming part of said linkage, said cam cooperating with said rod, said cam having an actuating cam face portion for moving the rod over a first vertical distance during normal load conditions and an idle cam face portion for moving the rod over a second vertical distance which is relatively smaller than said first distance corresponding to movement of a suspension spring of the vehicle outside of a normal spring deflection range whereby said valve will continue to operate regardless of any deflection of the vehicle spring outside said normal deflection range.

2. A valve as claimed in claim 1 wherein the linkage includes a lever with a pivot pin secured to one end of a connector, the other end of said connector is supported by the bracket with another pivot pin, and the connector is adjustable about the said latter pin.

3. A valve as claimed in claim 1 wherein the cam is formed with said cam face on its upper edge for engagement with a member affixed to said rod.

4. A valve as claimed in claim 1 wherein the cam is formed with said cam face on its lower edge for engagement with a member affixed to said rod.

5. A valve as claimed in claim 1 wherein the cam face takes the form of a slot in a plate member.

6. The valve of claim 1 wherein said stopper element of said rod includes a portion to limit movement of said control piston unit in a downward direction.

7. The valve of claim 1 wherein said stopper element of said rod includes a portion to limit movement of said control piston unit in an upward direction.

8. The valve of claim 1 wherein the cam and the idle cam face each have a center of rotation and said center of rotation of the idle cam face is substantially the same as the center of rotation of the cam.

* * * * *